United States Patent
Setzler

[15] 3,654,688
[45] Apr. 11, 1972

[54] SYSTEM FOR INSERTION TOOL CONTROL

[72] Inventor: Paul C. Setzler, Sherman, Conn.
[73] Assignee: Heli-Coil Corporation, Danbury, Conn.
[22] Filed: Dec. 11, 1969
[21] Appl. No.: 884,194

[52] U.S. Cl..............................................29/240, 408/130
[51] Int. Cl..................................................B23p 11/00
[58] Field of Search........................77/32.9; 10/136; 29/240

[56] References Cited

UNITED STATES PATENTS

| | | | |
|---|---|---|---|
| 3,137,016 | 6/1964 | Berlant | 10/136 |
| 3,441,965 | 5/1969 | Cutrone | 10/136 X |

Primary Examiner—Andrew R. Juhasz
Assistant Examiner—Leon Gilden
Attorney—Watson, Leavenworth & Kelton

[57] ABSTRACT

A method for controlling the rotative and translational movement of an insertion tool adapted to securably embed inserts in thermoplastic bodies is set forth along with a control system for implementation of the method. The method involves the steps of imparting rotational and extending forces to a tool threadably carrying an insert to partially liquify a thermoplastic body and seat the insert in a desired registration therein, discontinuing the rotational force and maintaining the extending force during an adjustable time period to permit resolidification of the molten thermoplastic body, thereafter discontinuing said extending force and applying both a reverse rotative force and a retracting force to said tool to dethreadingly retract same from said seated insert. In its preferred form the control system for implementation of the method includes fluidic logic control means.

6 Claims, 7 Drawing Figures

3,654,688

SYSTEM FOR INSERTION TOOL CONTROL

BACKGROUND OF THE INVENTION

The present invention relates to a method for the securable embedment of inserts in thermoplastic bodies and to a control system for implementation of the method. The invention pertains more particularly to a method and system for controlling an extendable, retractable rotative insertion tool for the embedding of metallic inserts in thermoplastic bodies to provide anchorage means by which said bodies may be secured to other structures.

Present embedding of types of fastening devices such as conventional screws, annularly beaded cylindrical pins and like inserts in bodies comprised of thermoplastic material generally involves high frequency vibration and axial thrust of such fastening devices into the thermoplastic body. By initial interference fit of the vibrating insert and the thermoplastic body a portion of the thermoplastic body is heated. By virtue of limited heat generation in these insert embedding procedures, the thermoplastic body has a tendency to resolidify during insertion and prior to completion thereof. Less than adequate bonding of the insert and body occurs unless particular concern is had for the variables attending insertion such as machine performance, thermoplastic body characteristics, insert configuration and insertion tool retraction. Such characteristics of prior art insert embedment are substantially avoided by the method and system for insertion tool control of the present invention.

SUMMARY OF THE INVENTION

In the present invention, continuous heat generation and liquification of the entire interface between an insert and a thermoplastic body is provided by the controlled application of extending and rotative forces to the insertion tool which threadably carries the insert. Upon completion of the insertion step, the method of the invention involves the maintenance of the insert in precise registration with said liquified body portion throughout a time period required for resolidification. Thereafter, the tool is rotatively retracted whereby dethreading of the tool from the seated insert is accomplished.

The invention includes further a control system for precise impartation of extending, rotative, retracting and reverse rotative forces to the tool, said control system being operatively responsive to tool position signals provided by sensors associated with the tool. The control system is particularly adapted to provide such multiple forces to the tool in response to a first indication that the tool has begun its extending movement and a second indication that the tool is in residence or has previously resided in its extended position during the course of the tool cycle being controlled.

In a preferred embodiment of the control system, the system comprises electrical, pneumatic and mechanical control elements in such cooperation as to provide said rotative force through the agency of an electric motor and said extending and retracting forces through the agency of a pneumatic cylinder housing said insertion tool for rotative and translational movement. In its disclosed generalized embodiment, the control system provides control of an insertion tool in accordance with the method of the invention through any suitable force generators. Thus, the invention may be practiced by use of a tool which may be completely electrical, mechanical or pneumatic in nature.

It is an object of the present invention to provide a method for operating an insertion tool in a manner providing improved seating of inserts in thermoplastic bodies.

It is a further object of the invention to provide a control system for controlling the application of bidirectional translational and rotative forces to a machine tool to permit precise operation of the tool in securably embedding inserts in thermoplastic bodies.

Other objects of the invention will in part be obvious and will in part appear from reference to the following detailed description of the invention taken in connection with the accompanying drawings wherein like numerals identify similar parts throughout.

DESCRIPTION OF THE PREFERRED EMBODIMENTS

Figure 1:
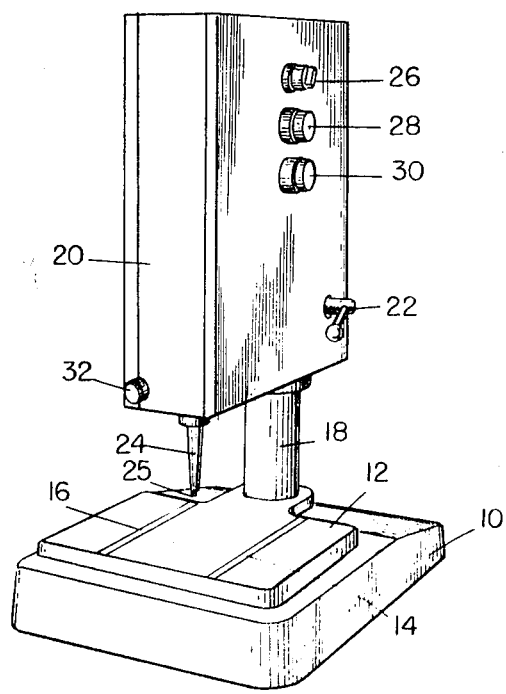
FIG. 1 is a perspective view of an insertion tool employable in practicing the invention.
Figure 2:
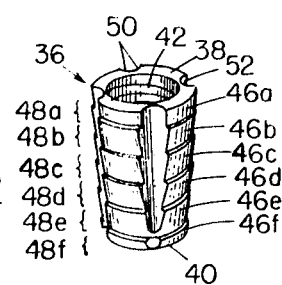
FIG. 2 is a perspective view of a particular insert adapted for use in practice of the invention.

Referring to FIG. 1, the insertion apparatus comprises a base 10 having secured on the upper surface thereof a workpiece platform 12 including grooves 14, 16, adapted to receive and retain a chuck or like workpiece holder. A shaft 18 extends upwardly from base 10 and supports a drill head and control system assembly 20. Assembly 20 is slidably mounted on shaft 18 for variable positioning relative to platform 12 and is locked in position by clockwise rotation of lever 22. Extending downwardly from assembly 20 and controllably movable relative thereto is a conically shaped mandrel 24 provided with an externally threaded portion 25 for receiving an insert of such type as is illustrated in FIG. 2. Mounted exteriorly of assembly 20 for ready access are a plurality of control knobs 26, 28, 30 and 32, operation of which initiates and controls said movement of mandrel 24 relative to assembly 20.

Insert 36 of FIG. 2 may be of the solid bushing type comprising a convergently tapering anchoring body having opposite driving and leading ends 38 and 40 respectively. Insert 36 is provided with an internally threaded bore 42 for receiving mandrel externally threaded portion 25. After joinder of the insert and thermoplastic body 44 (FIG. 3) by the apparatus of FIG. 1, an externally threaded stud may be threadably mounted in bore 42 for anchoring other elements or members to body 44.

The elongated anchoring body 36 is preferably provided with a plurality of longitudinal series of stepped, transversely extending rib segments, such rib segments in each of these longitudinal series being indicated by the reference numerals 46a through 46f. Each of the rib segments 46a through 46f inclusive occupies one of a series of longitudinally-successive, transverse zones 48a through 48f of the exterior surface of the insert anchoring body with the rib segments therein being laterally offset from the longitudinal axis of the body progressively more from the leading end 40 of the latter rearward throughout this tapered portion. Each of the rib segments 46a through 46f inclusive respectively will be observed to have a leading oblique wedging face flared laterally outward in a rearward direction respectively to a transverse crown for facilitating entry into thermoplastic body 44 and respectively a trailing abrupt rear edge behind its crown back of which plastic melted during rotative entry will flow and congeal to thereafter resist insert withdrawal.

The elongated, ribbed, anchoring body of the insert 36 is provided with annularly facing abutment means against which congealed plastic may bear to resist forced rotation of the insert when embedded in the plastic body. Such abutment means are provided by the opposite sides 50 of a plurality of substantially equally spaced apart, longitudinal grooves 52. Each of the grooves 52 preferably is arcuate in transverse section and preferably these grooves are arranged substantially parallel to the longitudinal body axis. As a result, a series of successive notches are formed by each longitudinal groove 52 through rib zones 48a through 48d, since each longitudinal groove 52 is of a depth sufficient to intercept the notches defined in these zones.

Figure 3:
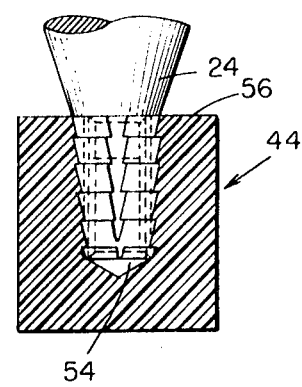
FIG. 3 is a front elevational view partly in section illustrating typical registration of an insert and associated thermoplastic body provided by the invention.

Referring to FIG. 3, insert 36 is shown embedded in body 44 in the manner described immediately above, with mandrel threaded portion 25 seated in insert axial bore 42. Body 44 is provided with a cylindrical or partially tapered pilot hole 54, extending downwardly from surface 56, the hole, prior to entry of insert 36 therein having a diameter in at least the inner sections thereof no greater than the diameter of the leading end portion 40 of the insert. At a depth slightly below surface 56, the pilot hole diameter is preferably slightly greater than that of portion 40 to facilitate seating of the insert.

While inserts of the type illustrated in FIG. 2 are preferred, it will be evident from the above discussion of FIGS. 2 and 3 that inserts employable in conjunction with the apparatus and method of the invention should be generally cylindrical with circumferential and/or axial slots, grooves, knurls or other irregular surface characteristics effective to lock the insert against axial and rotational movement in the thermoplastic body after the insert is embedded therein.

In embedding insert 36 in body 44, mandrel 24 is rotated to provide rotational movement for the insert and the mandrel is controllably lowered during such rotation to insert leading edge 40 of the insert into partially tapered hole 54 of the thermoplastic body. Continued downward movement of the insert by the mandrel and continued rotation thereof results in localized heating due to friction between the inserts and the thermoplastic material resulting from the above-discussed diameter selection for the tapered hole in body 44. Such frictional heat is created by rotating one member relative to the other while pressing the two into what would normally be an interference fit. Local melting of the plastic takes place during this spinning or rotation and, upon or slightly before lowering of the mandrel into such position as to provide proper registration of the insert in the workpiece body, mandrel rotation is stopped abruptly to prevent further unnecessary melting or possible charring of the plastic. Thereupon the insert is held in such precise registration by the mandrel for a sufficient period of time to permit resolidification of the molten plastic.

Following resolidification, mandrel threaded portion 25 must be dethreadingly retracted from insert bore 42. To avoid damage to the bore threads or to the newly formed metal thermoplastic bond, it is preferable that the mandrel not exert any abrupt force on the insert threads during this period. As will be made clear hereinafter, means may be provided in the apparatus of the invention for threadably removing the mandrel from the insert after resolidification with elimination of these possibilities of damage by limiting retracting force applied to the mandrel as it is threadably removed from the insert. Thereafter, the mandrel is fully retracted in readiness for a further insert-embedding cycle.

Figure 4:
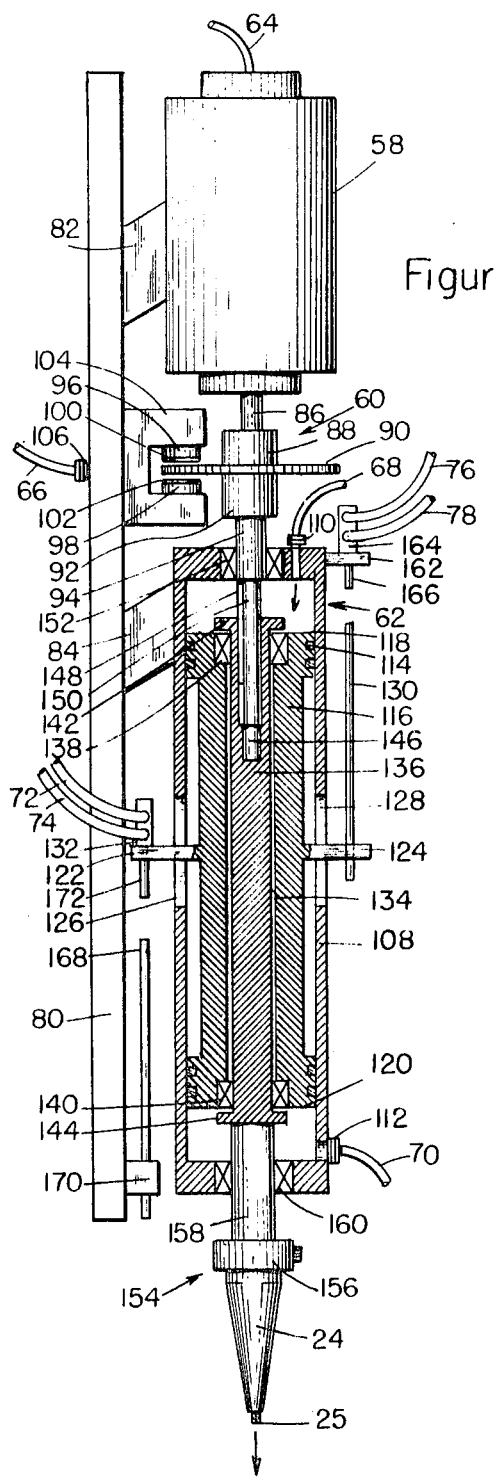
FIG. 4 is an elevational view, partly in section, illustrating an extendable-retractable rotative insertion tool adapted for operation in accordance with the invention.

The drill head portion of drill head section assembly 20 is illustrated in FIG. 4 and comprises three distinctly functioning subsections including motor 58, brake assembly 60 and drill head 62. Electrical signals for energizing the armature and field windings of motor 58 are derived from the control system of FIG. 5 over multi-conductor cable 64. Pneumatic signals for control of brake assembly 60 and drill head 62 are derived from the control system over lines 66, 68 and 70 respectively. Pneumatic input signals are provided by drill head 62 to the control system through lines 72, 74, 76 and 78.

A vertical frame 80 rigidly supports the three sections of the drill head section, motor 58 being fixed thereto by a bracket 82, brake assembly 60 being affixed directly thereto and drill head 62 being coupled to the frame by a bracket 84. Motor shaft 86 is connected through a coupling 88 to a braking disc 90 which is in turn connected through a coupling 92 to the drill head shaft 94. Disc 90 is rotated between a pair of braking pucks 96 and 98 bearing frictional brake linings 100, 102 respectively. The braking pucks are mounted in a brake housing 104 for movement into and out of contact with the disc. Internally of brake housing 104, the braking pucks are slidably disposed in brake cylinders (not shown) which are in common communication with brake assembly control port 106. Upon pressurization of this port by pneumatic signals applied through line 66 the pucks are driven into engagement with disc 90 for purposes of abrupt discontinuation of rotation of drill head shaft 94. Conversely, suction created at port 106 by pneumatic signals on line 66 is effective to withdraw the brake shoes from engagement with the disc.

Drill head 62 comprises a pneumatic cylinder 108 having an upper pressurization port 110 and a lower pressurization port 112. Slidably mounted by rings 114 for vertical movement within cylinder 108 is a piston member 116 having upper and lower faces 118 and 120 respectively. The piston carries laterally extending arms 122 and 124 adapted for movement exteriorly of cylinder 108 in slots 126 and 128 formed in the cylinder wall. Adjustably mounted in arm 124 is an actuating rod 130 and adjustably mounted in arm 122 is a lower limit valve 132.

Piston 116 is provided with a central axial bore 134 in which resides a spindle 136 supported for rotation relative to the piston by bearings 138 disposed in upper piston face 118 and bearings 140 disposed in lower piston face 120. Retaining members 142 and 144 are associated with spindle 136 and prevent relative axial movement of the spindle and piston.

Spindle 136 is provided with an axial bore 146 interiorly contoured in such manner as to receive spline 148 of splined shaft 150. The spline and bore 146 are of sufficient depth to provide mutual engagement therebetween during travel of piston 116. Shaft 150 is coupled to drill head shaft 94 for imparting rotational drive to spindle 136, shaft 94 being supported for rotation by bearings 152 at the upper portion of drill head 62.

Rotation of spindle 136 is effective to provide rotation for tool head 154 which includes mandrel 24, coupling 156 and stub shaft 158, the stub shaft being secured to retaining member 144 of spindle 136 and supported for rotation in drill head 62 by bearings 160.

Drill head 62 incorporates further an arm 162 adapted to support upper limit valve 164 in adjustable axial position with respect to the drill head. As will be evident, actuating rod 130 will operate valve 164 by abutting stem 166 thereof upon upward movement of piston 116. Similarly, actuating rod 168, adjustably supported by arm 170 of frame 80, will operate valve 132 upon abutting stem 172 thereof during downward movement of piston 116.

In FIG. 4 piston 116 is illustrated in transit between its uppermost position wherein mandrel 24 is in its retracted position and valve 164 is operated and its lowermost position wherein the mandrel is in its fully extended position and valve 132 is operated. In implementing the above-described steps of embedding insert 36 in thermoplastic body 44, piston 116 is initially in said uppermost position and valve 164 provides a signal to the apparatus control system indicating the piston to be so seated. In such position, lower limit valve 132 is remote from its associated actuating rod 168 and lower and upper cylinder pressurization ports 112 and 110 are respectively pressurized and unpressurized. Motor 58 is unenergized and braking pucks 96 and 98 are in engagement with disc 90.

In response to an operator demand, the apparatus control system directs release of the braking pucks from disc 90 by providing signals on line 66 and initiates forward (clockwise) rotation of shaft 86 by providing signals to motor 58 over cable 64. A time delay is preferably provided at this point to permit motor 58 to achieve operating speed. Thereafter, the control system provides signals to line 68 to initiate downward movement of piston 116, spindle 136 rotating at motor operating speed therein. As the piston descends, actuating rod 130 is disposed out of its prior engagement with stem 166 of upper limit valve 164, whereupon this valve provides signals over lines 76 and 78 indicative of such initial movement of the piston. Upon continued piston downward movement, actuating rod 168 engages stem 172 of lower limit valve 132 and operates same, thereby applying over lines 72 and 74 signals indicative of this state of descent of the piston. Pre-adjustment of actuating rod 168 is made such that the insert is in said position of registry at this time.

The control system response to the valve 132 signals to immediately deenergize motor 58 and cause engagement of braking pucks 96 and 98 with disc 90. At this time a molten plastic interface exists between the insert and the body. The control system is now operative to continue pressurization of upper port 110 and some slight further downward movement of the now non-rotating insert occurs. Control system pressurization of upper port 110 is maintained for a time period after the cessation of rotation of spindle 136 preselected to be of such duration as to permit resolidification of the molten plastic.

Upon expiration of this time period, the control system simultaneously depressurizes line 68 and restrictedly pressurizes line 70, applies suction to line 66 and provides signals through cable 64. Restricted pressurization of line 70 is effective to cause piston 116 to slowly retract at this time. The motor brake is released by the line 66 suction and the cable 64 signals induce reverse motor rotation.

With these conditions existing in the apparatus, mandrel 24 is threadably removed from insert bore 42, piston 116 being slowly retracted throughout the dethreading step.

As the piston seats in its retracted position, valve 164 is operated by actuating rod 130. Signals provided on lines 76 and 78 inform the control system of this condition whereupon the control system provides signals re-energizing the motor brake and deenergizing the motor, thus completing the operating cycle of the system.

Figure 5:
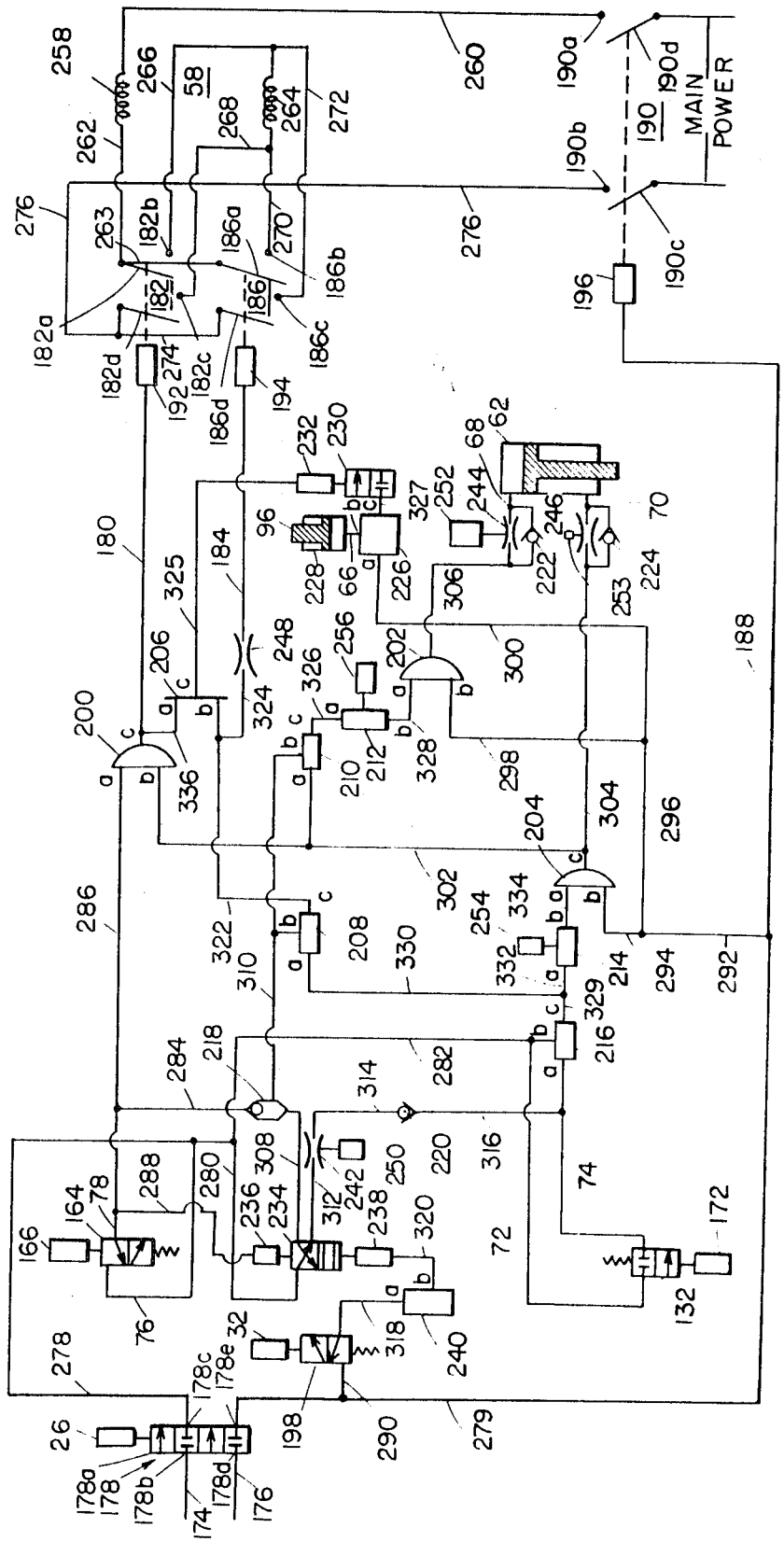
FIG. 5 is a schematic drawing of a preferred embodiment of the control system of the invention.

The control system portion of drill head and control system assembly 20 for directing the above-discussed performance of the component parts of the drill head assembly of FIG. 4 will now be considered in detail by reference to the schematic drawing thereof in FIG. 5.

Pressurized air is conducted by lines 174 and 176 to a manually operated master on-off valve 178 actuated by knob 26 of FIG. 1. The valve, shown in its normally open position, is typical of all valves of the control system, comprising a translatable valve spool 178a, input ports 178b and 178d, and output ports 178c and 178e. In the shown (OFF) valve position, spool 178a is effective to block communication between ports 178b and 178c and between ports 178d and 178e. In the ON position of the valve, spool 178a provides communication between these ports.

Line 174 air is oil-free whereas line 176 air is oil-containing for purposes of lubricating system components which it pressurizes. These components include the brake assembly 60 and drill head 62 to which the control system delivers output signals over lines 66 and 68, 70 respectively. Further system outputs are provided over line 180 to motor reverse direction switch 182, line 184 to the motor forward direction switch 186, and line 188 to main electrical power switch 190. These switches are pressurized air-responsive units and include pneumatic-to-mechanical (p–m) actuators 192, 194 and 196 respectively.

In providing these output signals, the control system is itself operatively responsive to various inputs. A first general category of input information is dynamic during a given machine cycle, and is derived from valves which are either operator-controlled or apparatus-controlled. These valves include valve 178 discussed above, start cycle valve 198 actuated by knob 32 of FIG. 1, upper limit valve 164 and lower limit valve 132. Valves 164 and 132 have associated therewith the mechanical-to-mechanical actuators, constituted by the valve stems 166 and 172 (FIG. 4). The second category of input information is static during a given machine cycle, and is varied in accordance with requirements of variation in machine performance from workpiece to workpiece. This information is entered by operator adjustments to the positions of valves 164 and 132 actuating rods 130 and 168 and relative to the drill head, and by further adjustment to components of the control system as will be discussed in detail hereinafter.

Various pneumatic logic elements are employed in the control system, including AND gates 200, 202 and 204, OR gate 206, NOT gates 208 and 210, time delay elements 212 and 124, and memory element 216. The system includes a double check valve 218 and single check valves 220, 222 and 224.

A vacuum transducer 226 is operatively associated with brake cylinder 228 of brake housing 104 under the control of valve 230, the spool of which is displaced by p–m actuator 232. A valve 234 is provided and is operated in a first direction by pneumatic-to-pneumatic (p–p) actuator 236 and in a second direction by p–p actuator 238, the latter being responsive to a monostable fluidic element 240. Element 240 has an input port a and an output port b and is operative, upon pressurization of port a, to provide an output signal at port b for a fixed time period, irrespective of the duration of the input signal.

Restricting elements 242, 244, 246 and 248 are employed in certain lines of the system, elements 242, 244 and 246 being variably settable by associated controllers 250, 252 and 253. Controller 252 is adjustable by knob 28 of FIG. 1. The system time delay elements 212 and 214 have associated therewith controllers 256 and 254, the latter being adjustable by knob 30 of FIG. 1.

The system logic components, taken individually, perform conventional logical operations. AND gates 200, 202 and 204 each have input ports a and b and an output port c, which will yield a pressurized or ON output signal only upon the coincident pressurization of input ports a and b. OR gate 206 has input ports a and b and an output port c which will yield a pressurized output signal if either (or both) of its input ports a, b is pressurized. NOT gates 208 and 210 each have input ports a and b and an output port c, which will yield a pressurized output signal when input port b is pressurized and, coincidentally, input port a is unpressurized. Under all input signal conditions other than those specified above for each of these system logic elements, output ports c thereof will yield unpressurized or OFF signals.

Memory element 216 is also a conventional fluidic logic element. It is "set" by a pressurized input signal at port a and will, at that time and thereafter, during pressurization of port b, and until "reset," provide a pressurized signal at output port c. The element is "reset" only by the venting of port a to atmosphere, whereupon the element memory is cleared and provides an unpressurized signal at port c.

Timing elements 214 and 212 are alike in operation, having input ports a and output ports b and providing a pressurized signal at port b at a given time after pressurization of input port a, as established by setting of controllers 254 and 256. Upon depressurization of ports a, ports b are instantly depressurized.

Vacuum transducer 226 has an input port a and output ports b and c. Pressurized air applied to input port a when output port c is blocked results in pressurization of output port b and the application of pressurized air over line 66 into cylinder 228 to direct braking puck 96 into engagement with disc 90 (FIG. 4). Conversely, when port a is pressurized and port c is unblocked, pressurized air applied to port a flows through the transducer and exits at port c into the atmosphere, creating suction pressure at port b which results in the withdrawal of the braking puck from its disc-engaging position.

Motor 58 includes an armature winding 258 connected at one terminal thereof by line 260 to contact 190a of switch 190. The other armature winding terminal is connected by lines 262 and 263 to contact arms 182a and 186a of switches 182 and 186. The field winding 264 of the motor is connected over lines 266 and 268 to the contacts 182b and 182c of switch 182 and in parallel manner over lines 270 and 272 to contacts 186b and 186c, respectively of these switches. The contact arms 182d and 186d of the switches are connected through lines 274 and 276 to contact 190b of switch 190. Upon energization of actuator 196 the contact arms 190c and 190d of switch 190 engage contacts 190a and b of switch 190 thereby applying main power to the motor. It will be evident from the drawing that as switch 182 is closed, armature winding 258 and field winding 264 will be connected in series across lines 260 and 276 so as to provide a first direction of rotation of the motor shaft, whereas if switch 186 is closed in place of switch 182, the field winding will be reversibly connected in series with the armature across lines 260 and 276 to provide a reverse direction of rotation of the motor shaft.

The control system and apparatus is normally maintained in readiness for an operating cycle by maintaining knob 26 of FIG. 1 in its ON position. The following conditions thus normally exist. Valve 178 is operated and supply lines 174 and 176 are in communication with lines 278 and 280, which are thus pressurized. Line 278 being ON, dependent lines 76, 280, 282 and 72 are also ON. Since the spools of limit valves 132 (unactuated) and 164 (actuated) are in their positions shown in FIG. 5, lines 74 and 78 are OFF. Lines 284, 286 and 288, dependent on line 78, are OFF.

Line 279 being ON, dependent lines 290, 292, 294, 296, 298, 300 and 188 are ON. Thus pressure signals are applied to start cycle valve 198, ports b of AND gates 202 and 204, transducer 226 and actuator 196. Since valve 230 is in the illustrated state, transducer 226 is operative to cause engagement of the braking pucks and disc 90. Switch 190 is closed by actuator 196 and main power is applied to lines 260 and 276. As will appear presently, ports a of AND gates 202 and 204 are unpressurized and thus lines 302, 304 and 306 are OFF.

Valves 198 and 234 being in their illustrated states, lines 308 and 310 are vented to atmosphere and lines 312 and 314 are ON. Check valve 220 is seated isolating line 316 from the atmosphere. Since lines 286 and 310 are not ON, AND gate 200 and NOT gate 208 are OFF as are output lines 180 and 184. Switches 182 and 186 being OFF, main power line 276 is not connected to field winding 264 and motor 58 is unenergized.

With such conditions existing in the control system of FIG. 5 and the apparatus of FIG. 4 and with adjustments having been made to properly position limit valve actuator rods 130 and 168 to adapt system performance to a particular workpiece and insert, an operating cycle may be commenced by operation of push button 34 which actuates cycle start valve 198. The details of this cycle will be clarified by reference to both the timing diagram of FIG. 6 and to FIG. 5.

At cycle time $t_0$ valve 198 places lines 290 and 318 in communication, thereby applying an ON signal to port a of monostable element 240. Output port b thereof goes ON and remains on for a short time, pressurizing line 320 and p—p actuator 238. The spool of valve 238 is translated to place lines 280 and 308 in communication and to vent line 312 to atmosphere. The latter venting operation releases check valve 220 which vents port a of memory element 216 to atmosphere, clearing the element of any prior contents.

Line 280 pressurizes line 308 and port a of double check valve 218. Port b of valve 218 is forceably closed and an ON signal is conducted through port c of the valve to line 310 and thence to ports b of NOT gates 208 and 210. Input ports a of the NOT gates being OFF at this time, ON signals are developed at output ports c of both NOT gates. Line 322 conducts the ON signal from NOT gate 208 directly to port b of OR gate 206 and through line 324, constrictor 248 and line 184 to p–m actuator 194. Input port b of OR gate 206 being ON, output port c thereof applies an ON signal over line 325 to p–m actuator 232 which operates valve 230 such that port c of transducer 226 is unblocked and placed in communication with the atmosphere through line 327. Unblocking of transducer port c results in suction pressure signals on line 66, resulting in disengagement of the braking pucks from disc 90. At the same time, pressurization of actuator 194 closes forward motor switch 186 whereupon the field and armature windings of the motor are connected across energized lines 276 and 260, and the motor commences rotation in the forward direction. At this juncture in system operation, substantially time $t_0$, the motor is rotating in the forward direction and the motor brake is released.

As a further $t_0$ occurrence, NOT gate 210, with input port a OFF, responds to said pressurization of port b thereof to develop at port c an ON signal which is conducted over line 326 to input port a of time delay element 212. After a time delay, established by setting of controller 256, there results at element 212 output port b an ON signal which is applied over line 328 to input port a of AND gate 202. Thus at time $t_1$, with pressurization of both input ports thereof, AND gate 202 provides at output port c thereof an ON signal which is conducted over line 306 both to constrictor 244 and check valve 222, the latter being closed thereby. Pressurized air is conducted through constrictor 244 to line 68 to upper pressurization port 110 of drill head 62 whereupon piston 116 commences downward movement. The rate of downward advance of the piston is controlled by setting of controller 252 of constrictor 244. The delay developed in timing element 212 insures that the motor will be at full rotational speed prior to downward movement of piston 116.

As the piston descends downwardly, upper limit valve 164 actuator 130 disengages stem 166 (FIG. 4) resulting in a shift of the valve at time $t_2$ into the state thereof providing continuity between lines 76 and 78. With valve 164 thus operated pressurized air is directed through line 288 to actuator 236, which returns valve 234 to its original state connecting lines 280 and 312 and checking valve 220. At the same time, ON signals are maintained on line 310, despite venting of port a of valve 218 to atmosphere, since line 284 is ON pressurizing port b of valve 218, forceably closing port a.

In this state, valve 164 is also effective to supply an ON signal to port a of AND gate 200, but output port c thereof remains OFF since input port b is OFF.

The continued application of ON signals to ports b of NOT gates 208 and 210 during this period by constant pressurization of line 310 insures continuous pressurization of lines 68, 325 and 184 such that motor rotation and piston descent continue without interruption.

As the piston downward movement continues, the mandrel and insert forceably enter the workpiece as discussed above. Such entry continues whereupon actuating rod 168 engages valve stem 172 at time $t_3$ and lower limit valve 132 is shifted from its illustrated state to its state providing continuity between lines 72 and 74.

Pressurization of line 74 results in an ON ("set") signal at port a of memory element 216 which thereupon provides an ON signal at output port c thereof. The memory element will remain "set," despite subsequent loss of the ON signal at port a, until check valve 220 is released, venting port a to atmosphere and resetting the element.

The ON signal at memory element port c is applied over lines 329 and 330 to port a of NOT gate 208 whose output at port c is thus turned OFF. Since lines 322, 324 and 184 are no longer pressurized, forward movement switch 186 reverts to its OFF position. OR gate 206 port c also goes OFF, and valve 230 reverts to its illustrated position. Thus, motor 58 ceases rotation and is braked at time $t_3$.

At this juncture piston 116 and mandrel 24 are driven into their extended positions and the insert is in its seated position in the workpiece and maintained in such registration by continued pressurization of lines 306, 68 and upper drill head port 110. Resolidification of the molten plastic commences and is completed prior to further control system activity.

The ON signal at port c of memory element 216 is also applied over lines 329 and 332 to input port a of time delay element 214. At time $t_4$, subsequent to said resolidification and established by setting of controller 254, output port b of element 214 becomes pressurized and this ON signal is applied over line 334 to input port a of AND gate 204.

Since both inputs to gate 204 are ON, output port c thereof is turned ON pressurizing lines 302 and 304. Line 302 conducts an ON signal to port b of AND gate 200 and output port c thereof becomes pressurized since port a input line 286 remains pressurized during this period. As a result line 180 becomes pressurized and reverse motor switch 182 is closed by actuator 192. At the same time output port c of AND gate 200 pressurizes line 336 providing an ON signal to port a of OR gate 206. Line 325 becomes pressurized by output port c of the OR gate again operating valve 230 through actuator 232, deenergizing brake assembly 60. The unbraked motor commences reverse rotation at time $t_4$. At the same time pressurization of line 304 results in pressurization of lower drill head port 112 restricted by setting of controller 253 of restrictor 246. Upper port 110 of drill head 62 becomes unpressurized at this time by the following control system activity.

Pressurization of line 302 results in application of an ON signal to port a of NOT gate 210 and output port c of the gate goes OFF. Line 326 is thereby OFF as is input port a of time delay element 212. Output port b of element 212 is instantly turned OFF and line 328 conducts an OFF signal to AND gate 202 port a. With loss of pressurization of AND gate output port c, line 306 is turned OFF and drill head upper port 110 is vented to atmosphere through check valve 222. Controlled upward piston movement commences as dethreading occurs.

As the piston moves upwardly lower limit valve 132 reverts to its illustrated state at time $t_5$. No change in system operation occurs immediately as a result of such change in the state of valve 132 since check valve 220 remains effective to prevent application of atmospheric pressure to memory element 216 of port a. This of course will not occur until the next cycle of operation of the machine when valve 234 is again operated. As piston 116 reaches its retracted position at time $t_6$, valve 164 is actuated and reverts to its illustrated position. Consequent loss of pressurization by line 286 results in the turning OFF of AND gate 200 output port c whereupon switch 182 reverts to its OFF position and valve 230 reverts to its OFF position, reenergizing brake assembly 60 to brake the deenergized motor.

Having completed this single cycle of operation, the control system and apparatus remain in a state of readiness for the next cycle. In this state of readiness, the motor is deenergized and braked and lower drill head port 112 is pressurized to maintain the mandrel in its retracted position. It will be evident that the system can be modified to accommodate different inserts and workpieces by appropriate readjustment of the setting of controller 254 which governs the resolidification time period, by adjustment of controller 252 which governs rate of descent of the mandrel, by adjustment of controller 253 which governs the mandrel retraction rate and by adjustment to the positions of valve actuating rods 166 and 172. Where motor 58 has a suitable starting speed characteristic, time delay element 212 may be omitted such that mandrel descent occurs without delay after operation of push button 32.

Figure 6:
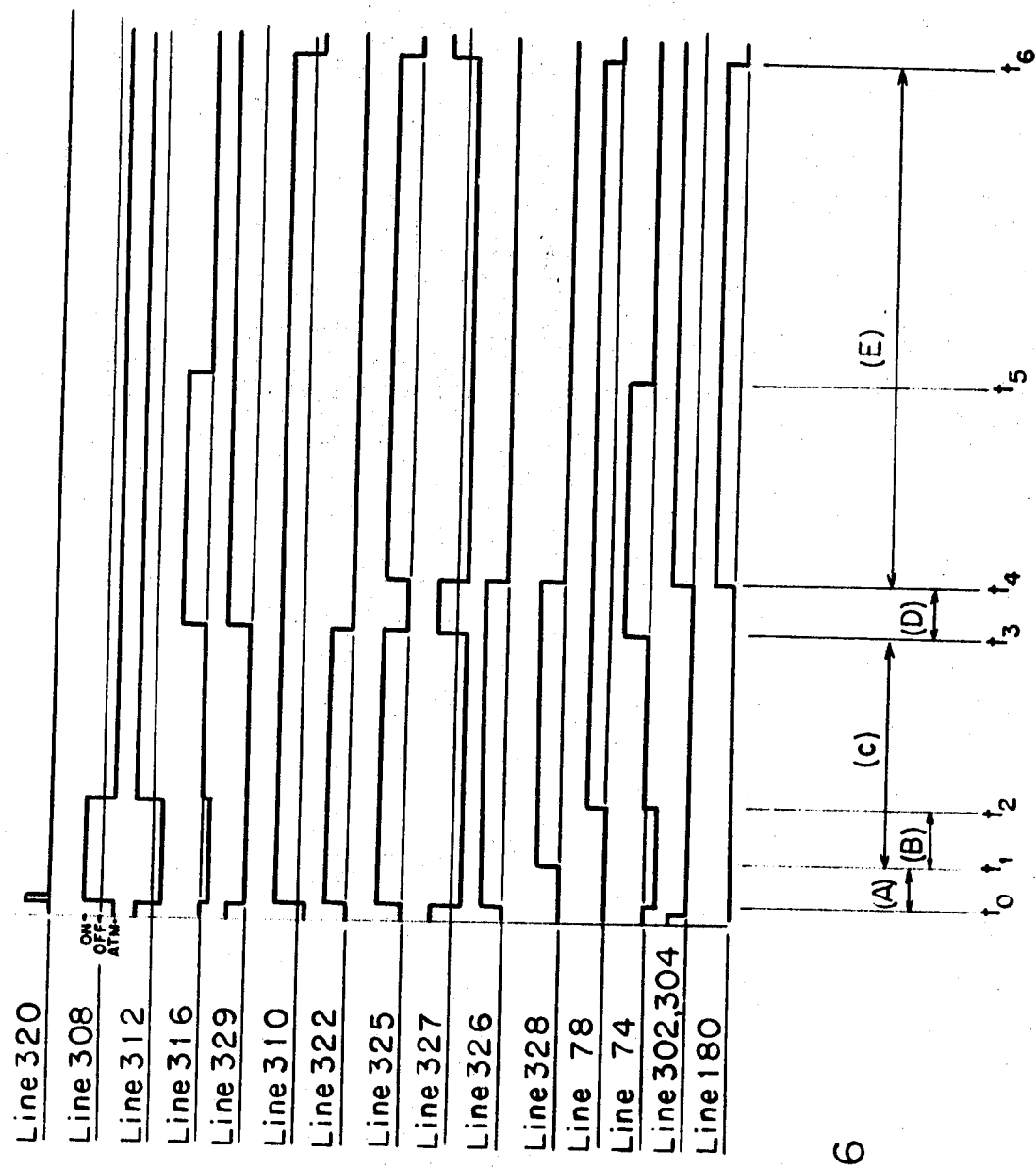
FIG. 6 is a timing diagram indicative of the process of the invention and the states of control system lines during a single cycle of the control system.

Referring to the timing diagram of FIG. 6, various lines of the control system are illustrated in their states of pressurization throughout the control system cycle. Three levels of pressurization are involved as will be seen by reference to the showing for line 308. The legend ON indicates a state of pressurization, the legend OFF indicates no pressurization and the legend ATM indicates that atmospheric pressure is applied to the line. The above discussed time instances $t_0 - t_6$ are correlated with the pressure versus time graphical illustration. Time periods (A) to (E) serve to indicate the significant time periods of the cycle.

In time period (A), deenergization of the motor brakes and prerotation of the motor to full speed occur. In time period (B) the mandrel commences its downward movement and at the end of this time period upper limit valve 164 becomes unactuated indicating this extent of mandrel travel. Time period (C) indicates the overall period during which the mandrel experiences downward movement from its retracted to its extended position. During time period (D), resolidification of molten plastic surrounding the seated insert occurs and at the start of this period the motor is braked and deenergized. Mandrel extending pressure continues throughout period (D). During time period (E), mandrel piston 116 is dethreadingly retracted from the securably embedded insert. The motor brake is released and reverse motor rotation occurs at the start of period (E) and controlled mandrel retraction is initiated whereby the mandrel is safely dethreaded from the insert. At the expiration of this time period upper limit valve 164 becomes actuated, whereupon the motor is braked and deenergized and the system is placed in readiness for a further operating cycle.

While a particularly described pneumatic-electrical-mechanical system for implementing the present method of extendable and retractable rotary tool control has been discussed to this point it will be evident from the following more general consideration of the system that various implementations thereof may be developed. In this generalized discussion reference shall be made to FIG. 7 wherein a functional block diagram of the system is set forth.

Figure 7:
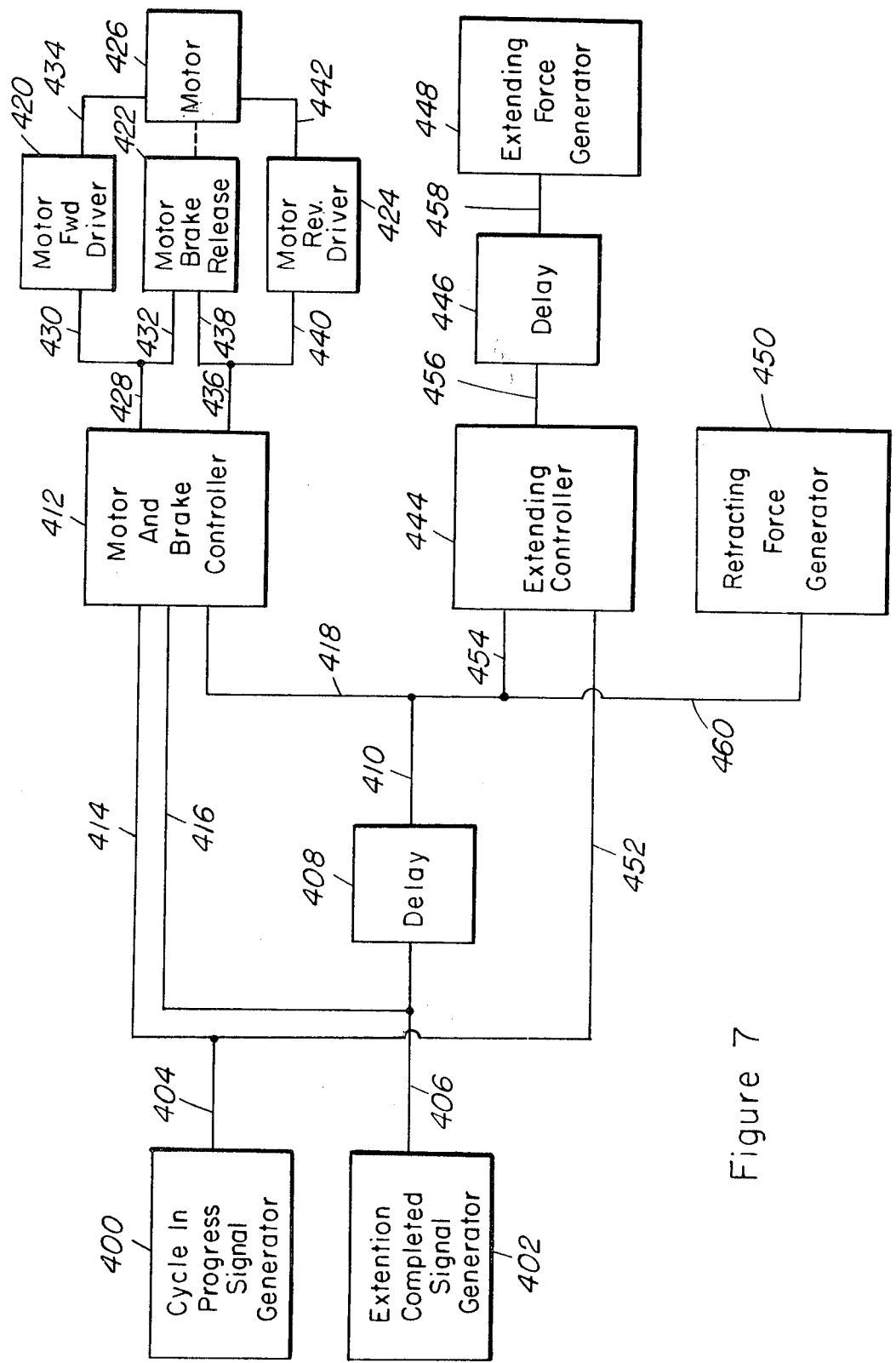
FIG. 7 is a functional block diagram of the control system of the invention.

The system of FIG. 7 comprises first and second signal generators 400 and 402 which provide output signals indicative of certain conditions in the tool control cycle. Signal generator 400 provides an output signal on line 404 at all times following initiation of the tool control cycle. In the particular embodiment of FIG. 5, line 310 corresponds to line 404, signals being provided on line 310 upon initiation of the cycle, i.e., actuation of valve 234, and thereafter upon non-actuation of valve 164, i.e., as the mandrel leaves its retracted position. Signal generator 402 provides an output signal on line 406 indicating that the cycle progress has advanced to the point thereof at which the controlled tool has reached its extended position. Signal generator 402 is adapted to continuously provide this output signal thereafter throughout the remainder of the cycle. In the control system of FIG. 5 line 329 corresponds to line 406, and memory element 216 and lower limit valve 132 comprise a particular version of signal generator 402. Line 406 is connected to delay element 408 which provides an output signal on line 410 at an adjustable time period after the generation of said signal on line 406. Delay element 408 corresponds to delay element 214 of the FIG. 5 control system.

All input information required by the control system of FIG. 7 is thus provided by elements 400, 402 and 408. These signals are respectively indicative of the cycle initiation and departure of the mandrel from its retracted position (cycle in progress), the arrival of the mandrel at its extended position (extension completed) and the expiration of the resolidification time period.

Motor and brake controller 412 is operatively responsive to these three input signals, provided thereto over lines 414, 416 and 418, to selectively operate motor forward driver 420, motor brake release 422 and motor reverse driver 424. Motor 426 provides the bidirectional drive for the controlled tool. Controller 412 includes first input signal combining circuit means adapted to generate a signal on line 428 upon the occurrence of a signal on line 414 and the coincident non-occurrence of a signal on line 416. Said signal on line 428 is conducted over line 430 to driver 420 and over line 432 to brake release 422. Thereupon motor 426 is unbraked, and is rotated in the forward direction by signals provided by driver 420 over line 434. Circuit elements 420 and 422 are operative to perform their motor driving and motor unbraking function only in response to said line 428 energization signal and upon the cessation of said signal, motor 426 is abruptly returned to its unenergized and braked condition. Thus, as a signal is provided on line 416 by completion of the extension of the controlled tool and operation of signal generator 402, controller 412 no longer generates said line 428 signal and motor 426 is deenergized and braked.

Controller 412 includes second input signal combining circuit means adapted to generate an output signal on line 436 upon the coincident occurrence of signals on input lines 414 and 418. The line 436 signal thus provided during operation of the cycle and following the resolidification period, is applied over lines 438 and 440 to brake release 422 and reverse driver 424. As a result motor 426 is unbraked and is driven in the reverse direction by signals provided by driver 424 over line 442.

The first signal combining means of controller 412 will be seen to correspond to NOT gate 208 of the control system. The second signal combining means of controller 412 corresponds to AND gate 200 of FIG. 5. Ready correspondence of the motor control and brake releasing elements will also be seen in the control system of FIG. 5.

The remaining elements of FIG. 7 including extending controller 444, delay unit 446, extending force generator 448 and retracting force generator 450, collectively comprise tool extending and retracting control means adapted to selectively apply extending and retracting forces to the controlled tool to direct same to its extended position, to maintain the tool in said position during resolidification, and finally to dethread and retract the tool. For this purpose, signal generator 400 output signals are conducted over line 452 to controller 444 along with delay element 408 signals over line 454. Controller 444 includes signal combining means adapted to generate an output signal on line 456 upon the occurrence of a signal on input line 452 and the non-occurrence of a signal on input line 454. Thus, line 456 will be energized at all times during the progress of the cycle up to the completion of the resolidification period. The line 456 signal may be applied to delay element 446 which operates to energize its output line 458 and hence generator 448 a given time period thereafter. Element 446 is optional, and is not required if motor 426 achieves operating speed quickly.

The signal provided by delay element 408 is applied over line 460 to retracting force generator 450. Line 460 will be energized only upon the completion of the said resolidification period whereupon generator 450 will apply retracting force to the tool.

The circuitry comprising extending controller 444 in the control system of FIG. 5 is NOT gate 210. Line 456 of FIG. 7 corresponds to line 326 of FIG. 5 and time delay element 212 of FIG. 5 corresponds to delay element 446 of FIG. 7. Line 458 of FIG. 7 has correspondence in line 328 of FIG. 5 and the force generator 448 may comprise AND gate 202, line 306, constrictor 244 and check valve 222 of FIG. 5.

Line 460 of FIG. 7 corresponds to line 334 of FIG. 5 and retracting force generator 450 may comprise AND gate 204, line 304, constrictor 246 and check valve 224 of the FIG. 5 control system.

While the invention has been disclosed by way of the foregoing preferred embodiments, since various modifications will be evident to those skilled in the art in respect of both the method and system herein, said embodiments are intended in a descriptive and not in a limiting sense. The true spirit and scope of the invention will be evident from the following claims.

What is claimed is:

1. A system for controlling translational and rotative movement of an extendable-retractable tool during the operating cycle thereof, said tool adapted for threadably supporting an insert to be seated in a workpiece, comprising:
   a. first signal generator means providing an output signal indicating non-residence of said tool in its retracted position;
   b. second signal generator means providing an output signal indicating that said tool resides in or has resided in its extended position during said operating cycle;
   c. means receiving said second signal generator output signal and regenerating same with predetermined time delay;
   d. tool extending and retracting means receiving said first signal generator output signal and said regenerated signal and operatively responsive thereto to apply extending force to said tool to direct same into said extended position, to continue application of said extending force to said tool in said extended position for said predetermined time, and to retract said tool thereafter; and
   e. means for rotating said tool independently of said tool extending means receiving said first and second signal generator output signals and said regenerated signal and operatively responsive thereto to rotate said tool in a first direction during said extension thereof into said extended position thereby seating said insert in said workpiece, to maintain said tool non-rotating during said predetermined time, thereby providing securement of said insert in said workpiece and to rotate said tool in an opposite direction during said tool retraction thereby dethreading said tool from said seated insert.

2. The system claimed in claim 1 wherein said tool rotating means includes tool rotational braking means receiving said first and second signal generator output signals and said regenerated signals and operatively responsive thereto to brake rotation of said tool during residence thereof in said extended position.

3. The system claimed in claim 1 wherein said tool extending and retracting means includes first means receiving said first signal generator output signal and said regenerated signal and applying said extending force in response thereto and second means receiving said regenerated signal and retracting said tool in response thereto.

4. The system claimed in claim 1 wherein said tool rotating means includes first means receiving said first and second signal generator output signals and providing said first directional rotation of said tool and second means receiving said regenerated signal and providing said opposite directional rotation of said tool.

5. The system claimed in claim 3 wherein said first means includes signal combining circuitry directing application of said extending force during occurrence of said first signal generator output signal and simultaneous non-occurrence of said regenerated signal.

6. The system claimed in claim 4 wherein said first means includes signal combining circuitry directing said first directional rotation of said tool during occurrence of said first signal generator output signal and simultaneous non-occurrence of said second signal generator output signal.

* * * * *

UNITED STATES PATENT OFFICE
CERTIFICATE OF CORRECTION

Patent No. 3,654,688   Dated April 11, 1972

Inventor(s) Paul C. Setzler

It is certified that error appears in the above-identified patent and that said Letters Patent are hereby corrected as shown below:

Item [73] Assignee: "Heli-Coil Corporation" should read --Mite Corporation--.

Signed and sealed this 15th day of August 1972.

(SEAL)
Attest:

EDWARD M. FLETCHER, JR.
Attesting Officer

ROBERT GOTTSCHALK
Commissioner of Patents